United States Patent [19]

DePalma et al.

[11] 4,451,532

[45] May 29, 1984

[54] MAGNETIC RECORDING COMPOSITION EMPLOYING MONO-DISPERSED SPHERICAL LOAD-BEARING PARTICLES

[75] Inventors: Vincent M. DePalma; Reginald J. Dilley; Mary F. Doerner, all of San Jose; Daniel A. Nepela, Los Gatos, all of Calif.

[73] Assignee: International Business Machines Corporation, Armonk, N.Y.

[21] Appl. No.: 268,415

[22] Filed: May 29, 1981

[51] Int. Cl.³ .............................................. H01F 10/02
[52] U.S. Cl. .................................... 428/336; 428/694; 428/900
[58] Field of Search ....................... 428/900, 336, 694; 252/62.54; 427/128

[56] References Cited

U.S. PATENT DOCUMENTS

Re. 28,866  6/1976  Haefele et al. ....................... 428/336
3,622,386  11/1971  Larsen ................................ 117/235
3,630,910  12/1971  Akashi et al. ....................... 252/62.54

FOREIGN PATENT DOCUMENTS

1227822  9/1918  United Kingdom .

OTHER PUBLICATIONS

W. B. Scott and E. Matijevic, "Aluminum Hydrous Oxide Sols" Journal of Colloid and Interface Science, vol. 66, No. 3, 10-1-78, pp. 447-454.

D. A. Nepela, "Control of Extra Bits (Errors) in Recording Media Containing Load-Bearing Particles" IBM TDB, vol. 23, No. 1 6-80, p. 296.

Primary Examiner—Bernard D. Pianalto
Attorney, Agent, or Firm—Walter J. Madden, Jr.

[57] ABSTRACT

A magnetic recording composition contains load-bearing particles which consist of a monodispersion of spherical particles distributed throughout the coating. The spherical particles have a diameter somewhat in excess of the finished coating thickness so as to extend above the coating.

4 Claims, 4 Drawing Figures

MAGNETIC RECORDING COMPOSITION EMPLOYING MONO-DISPERSED SPHERICAL LOAD-BEARING PARTICLES

FIELD OF THE INVENTION

This invention relates to formulations for magnetic recording coatings.

DESCRIPTION OF PRIOR ART

Direct access storage disk files generally require a minimum durability of the magnetic media which permits operation of such files with a relatively high reliability. This degree of mechanical reliability has historically been associated with a requirement for the addition of non-magnetic load-bearing particles to the coating formulation and/or the presence of lubricants on the disk surface, both of which contribute to the mechanical reliability of the disk file.

Intermittent contact between heads and disks can cause excessive wear of the magnetic recording film on the disk surface. Generally, load-bearing particles of hardness values similar to the hardness of the magnetic head materials are placed within the recording film. These materials range in hardness from $ZrO_2$ at 1160 Knoop hardness to diamond at 7000 Knoop hardness. Examples of some materials falling within this range are: tungsten carbide, titanium carbide, alumina and silicon carbide. These materials fulfill the function of insulating the recording film from the recording head during intermittent contact at file speed as well as during start-up and stopping of the machine. Selection of the correct material in terms of hardness, shape, size, recording density, load-bearing capacity, deformation and thermal and other material properties is an important consideration in the formulation of a magnetic recording coating. However, the presence of such non-magnetic load-bearing particles contributes significantly to media noise and establishes the final component signal/noise ratio.

Typically, the non-magnetic load-bearing particles are in the form of $Al_2O_3$ which are added to the coating mixture in a size range of approximately 1.5 micron to 3 micron particles (mean spherical equivalent size). The typical range of sizes at the 98% and 2% points of a cumulative distribution curve for a representative sample of such particles is 4.4 microns to 0.6 microns, or a ratio of $4.4/0.6 = 7.3$.

From a statistical point of view, the relationship to media noise of such particles can be expressed in three primary forms, and these are:

1. Extra bits—This phenomenon is generally expressed as the probability of finding load-bearing particles within a bit cell and their spatial alignment within the bit cell in the direction of head motion (phase) and their simultaneous probability of aligning their straight edges along the bit cell length (azimuthal effect on extra bit amplitude). This phenomenon produces unwanted signals that interfere with the desired signal and effectively can cause a bit to be sensed when one is not present, or can cause a clocking error by phase shifting through superposition of the extra bit in the stream of information bit signals and consequently resulting in errors in readback.
2. Missing bits—These are generally caused by the large particle tail of the typical size distribution of added load-bearing particles, and occur at a probability proportional to their number per recording surface. These types of defects result in a diminution of signal when present in a bit cell such that the minimum acceptable signal dictated by the particular machine logic cannot be achieved.
3. Statistical noise—The major components of the noise are:
   a. The magnetic particles themselves such as $\gamma$-$Fe_2O_3$.
   b. Added load-bearing particles and/or inadvertent voids in the particulate media.

From the above it is clear that if load-bearing particles are necessary, then the choice of particle shape is important, as well as the distribution of particle size expressed as $\sigma$, the standard deviation of the number versus size parameters. From a load-bearing point of view, it is evident that only particles whose dimension exceeds the magnetic media thickness are important. With a magnetic coating of 2 micron thickness, for a typical mean $Al_2O_3$ size of 2.5 micron (spherical equivalent) and a typical distribution of sizes, approximately 35% of the volume of particles present are at or below the coating thickness and do not contribute to load-bearing, and hence act as an unwanted source of noise while not contributing to load-bearing. Additionally, approximately 30% of the particles in this typical distribution exceed the coating thickness by an undesirable margin which ultimately contributes to asperities which can interfere with a flying head transducer and result in ultimate failure during flight if the flying height is at or below these higher asperities.

Although some 1,000 particles are instantaneously under a typical transducer slider area and only approximately 100 appear to be required for load-bearing purposes from a theoretical point of view, approximately several times this amount may be required to be present in the coating to ensure with certainty from a statistical point of view that the minimum required number are always present.

The magnetic requirements for a particulate magnetic coating are that an adequately large signal be obtained and that the media noise be low. The signal relates to the average magnetization of the media, while the noise is due to deviations from this mean magnetization. Those factors which contribute to media noise are the variations in media thickness, variations in particle magnetization direction and non-uniform spatial distribution of particles. The intentional inclusion of non-magnetic, load-bearing materials will contribute to media noise. The extent of this contribution will depend on the number of load-bearing particles (or particle agglomerates) and the average volume of coating displaced at each incidence.

Experimentation has shown that debris particles generated in the impact/shear devices used to create magnetic particle dispersions can be detrimental to magnetic performance as well. Therefore, the film itself should be free of any foreign debris which could contribute additional noise to the noise already created by the load-bearing particles. These particulate film requirements are extremely important in producing the highest quality magnetic recording media possible while simultaneously providing load-bearing capability for the recording head.

PRIOR ART

U.S. Pat. No. Re. 28,866 shows a magnetic recording coating having load-bearing particles therein which have one dimension approximately equal to the coating thickness.

U.S. Pat. No. 3,630,910 discloses a magnetic coating composition containing abrasive particles smaller than 4 microns in an amount from 10 to 100 parts by weight based on the weight of 100 parts of the binder.

U.K. Pat. No. 1,277,822 shows a magnetic coating formulation containing load-bearing particles in a concentration of from 0.1 to 6% by weight, based on the weight of the magnetic pigment.

U.S. Pat. No. 3,622,386 shows a magnetic coating composition having load-bearing particles with a size ranging from 50 to 100 percent of the magnetic coating thickness.

An article, "Aluminum Hydrous Oxide Sols.", by W. B. Scott and Egon Matijenic, Journal of Colloid and Interface Science, Vol. 66, October 1978, page 447, describes a process for producing spherical particles having relatively narrow size distributions.

IBM Technical Disclosure Bulletin, Volume 23, number 1, June 1980, page 296 teaches that load-bearing particles in a magnetic coating composition having spherical, conical, cylindrical or pyramidal shapes will produce less magnetic noise than particles having essentially straight sides.

SUMMARY OF THE INVENTION

The present invention employs mono-dispersed, spherical, load-bearing particles in a magnetic coating composition, these particles having a diameter slightly larger than the finished coating thickness. By using such particles, a maximum load-bearing effect is obtained, while the effect of such particles on the magnetic properties of the coating is minimized.

BEST MODE EMBODIMENT AND INDUSTRIAL APPLICABILITY

The average size and size distribution of the load-bearing particles is an important consideration in the present invention. The requirement for particle size is that the number per unit area be adequate to support the load of the magnetic head suspension device without protruding excessively from the coating. It should be clear that (1) fewer particles are required if the mean particle diameter is slightly larger than the media thickness, (2) particles of diameter less than the media thickness are not load-bearing and are eliminated, and (3) as a result of (2), a particle size distribution which eliminates the small particles will result in less media noise with no penalty in the durability of the coating brought about by the inclusion of load-bearing particles. Another consideration regarding the particle size is that the particles significantly larger than the finished coating thickness contribute disproportionately to the media noise. For this reason, the particle size distribution should also be narrowed to dramatically reduce the number of large particles present.

Figure 1:
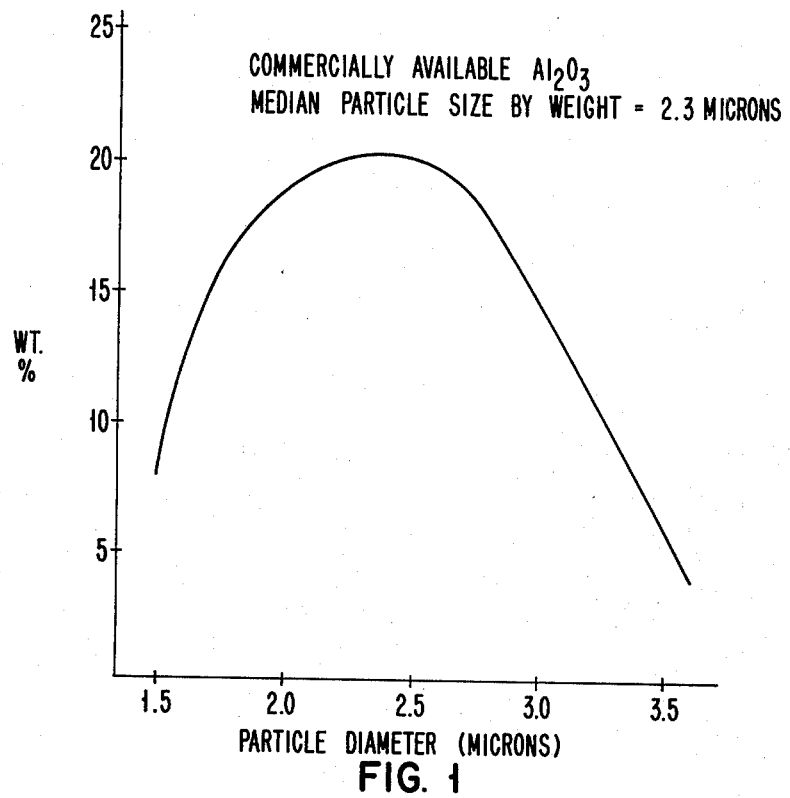
FIGS. 1 and 2 are graphs illustrating the particle size distribution in two commercially available load-bearing particle mixtures of different average particle size.
Figure 2:
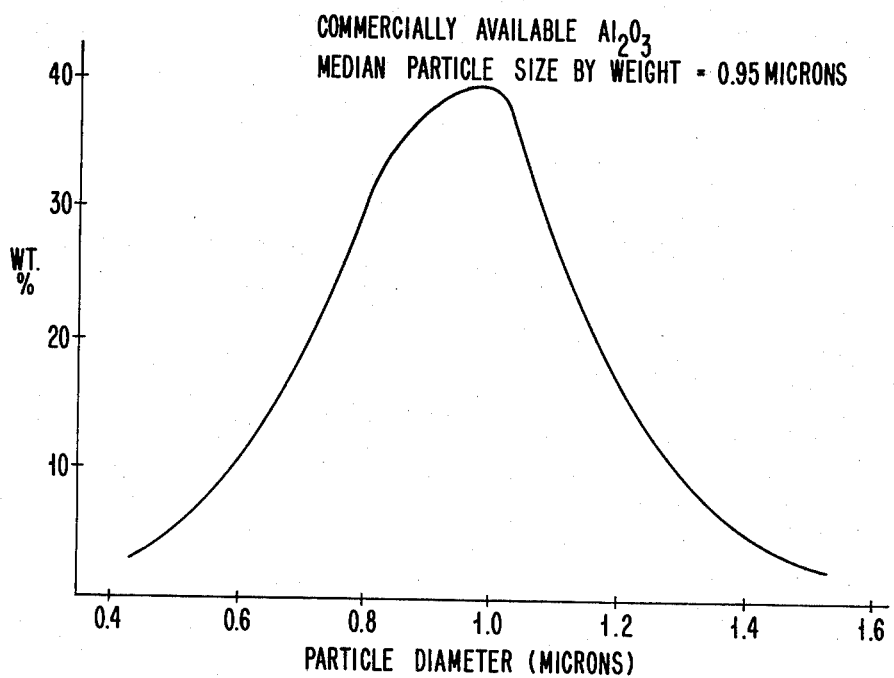

FIGS. 1 and 2 show size distributions of two median sizes of commercially available $Al_2O_3$ load-bearing particles. From FIG. 1 it can be seen that for a mixture of $Al_2O_3$ particles having a median particle size of 2.3 microns, a substantial number of such particles (>15%) have a size of 2 microns or less. Hence, in a magnetic coating having a finished thickness of 2.3 microns, this percentage of particles would be ineffective as load-bearing particles, for the reasons discussed above. Further, it can be seen from FIG. 1, that a substantial number (again >15%) of these particles have a size which is 20% or more larger than the median size of 2.3 microns. Thus, in a coating having a finished thickness of 2.3 microns, these particles could extend more than 20% above the coating, thereby creating potential asperity problems for a low flying transducer, as well as adding noise problems because of their size, as discussed above.

The size distribution shown in FIG. 2 for the particles having a 0.95 micron size is slightly better than for the 2.3 micron particles in FIG. 1, but it still can be seen that substantial numbers of the particles in the 0.95 micron mixture are significantly above or below the median size and hence are objectionable for the reasons given above. Typically, commercially available alumina has a size distribution in which the standard deviation ($\sigma$) exceeds 25% of the mean particle size. The present invention provides advantages by reducing the standard deviation to less than 12% of the mean particle size.

As was mentioned above, the magnetic noise in the media will increase as a greater volume of the coating is displaced. A sphere provides the shape in which the maximum amount of load-bearing material is present for a given amount of surface area. This then means that the most effective shape from a magnetic viewpoint for alumina particles is a sphere, and that any deviation from a spherical shape will result in more media noise.

From the above discussion it is apparent that the spherical, monodispersed particles of the present invention having a median diameter which slightly exceeds the media thickness are particularly effective as load-bearing particles.

The effect of load-bearing particle size on missing and extra bit defects is demonstrated in Table I. For a given bit cell size and clip level, there will be a critical particle size at which any particle larger than critical will trigger a defect. Therefore, the large particles in the load-bearing particle size distribution are the ones that contribute to defects. The size distribution is then very important. Two particle size distributions with the same mean size may give very different defect results if one contains many more large particles than the other. In the present invention, a monodispersed system is employed since a particle size less than the critical will result in no load-bearing caused defects.

Disk signal-to-noise data is also shown in Table I, and shows a dependence on load-bearing particle size. As the load-bearing particle size approaches the size of void areas between the magnetic particles due to less than ideal dispersion quality, contribution of the particle to noise will be minimized. Large particles in the distribution should be eliminated, making the monodispersed system of the present invention the ideal case.

TABLE I

Effect of load-bearing particle size on defects and signal-to-noise ratio.

| Mean Filler Particle Size (μ) | Missing Bit Sites (Number) | Extra Bit Sites (Number) | Disk Signal to Noise (db) rms/rms |
|---|---|---|---|
| .9 | 24 | 8 | 24.72 |
| 1.3 | 38 | 37 | 24.13 |
| 2.5 | 280 | 490 | 21.68 |

The effect of load-bearing particle size on disk durability is seen in Table II for a coating thickness of 0.69 microns. An improvement in durability is obtained at 0.9 microns over the 2.5 micron particle, since a larger number of load-bearing particles is obtained at this size. A degradation in life is seen as the particle size is reduced below the thickness of the coating. Since the small particles in the size distribution (those with a diameter less than the coating thickness) do not contribute to load-bearing, they are eliminated from the distribution in accordance with this invention.

Monodispersed load-bearing particles with a diameter 20% larger than the thickness of the coating is employed in this invention for optimum durability, thereby reducing the particle concentration required to a minimum.

TABLE II

Effect of load-bearing particle size on durability, at .5% concentration by volume.

| Mean Filler Particle Size (μ) | Durability (Mean Cycles to Failure) |
|---|---|
| .5 | 1071 |
| .9 | 2000 |
| 2.5 | 1560 |

Figure 3:
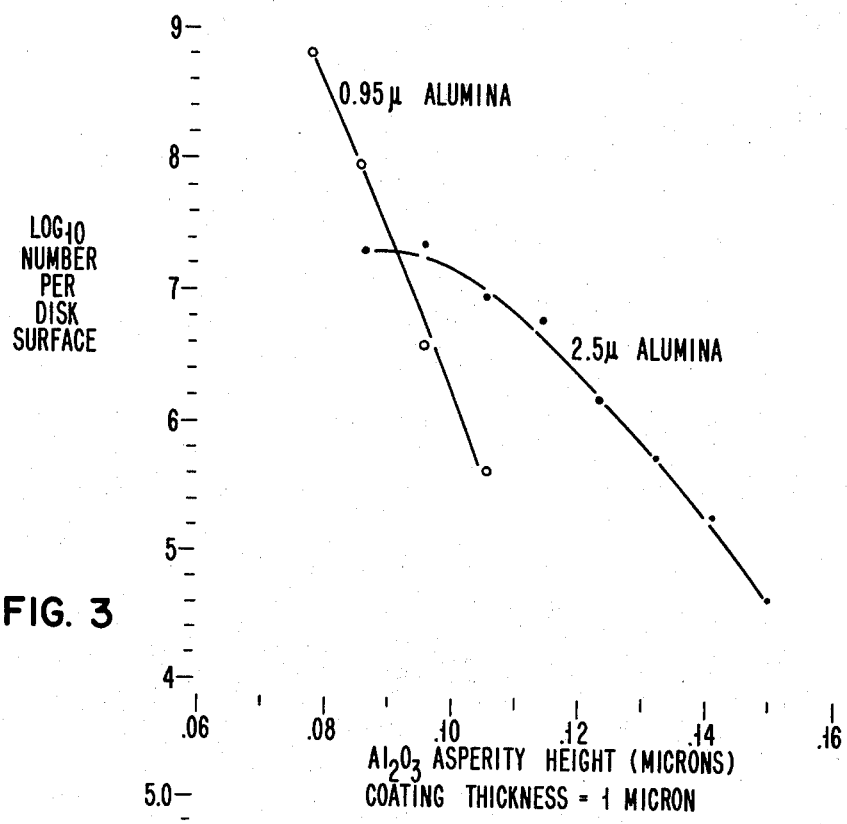
FIG. 3 is a graph of coating asperity height versus the number of asperities per disk surface for two different average particle size mixtures of load-bearing $Al_2O_3$ particles.

FIG. 3 is a plot of asperity height versus the number of such asperities on a disk surface for the 0.95 micron particle mixture whose size distribution is shown in FIG. 2 and a mixture having a median particle size of 2.5 microns. It will be understood that the asperity height is the amount by which a load-bearing particle protrudes above the finished coating. From FIG. 3, it can be seen, as would be expected, that the 2.5 micron particles result in larger asperities than the 0.95 micron particles, but that the 0.95 micron mixture results in a larger number of smaller asperities. For the monodispersion of spherical particles of the present invention, a plot comparable to FIG. 3 would be essentially a vertical line, with an asperity height equal to the amount by which the sphere's diameter exceeded the finished coating thickness.

Two major advantages of the use in the present invention of a monodispersion of spherical particles are:
1. reliability in flying
2. control of stiction A controlled asperity height above the coating is desired, for reliability in flying to prevent intermittent contact with the surface and prevent contacting the asperities. The desired asperity height will be dependent on the flying height of the transducer.

Stiction, or resistance to rotational motion between the transducer and the coating when the disk is at rest, is caused by lubricant material on the disk coating filling the space between the transducer and the coating. The present invention permits control of the spacing of the tranducer from the coating when the disk is at rest. This can be accomplished by selecting the desired spacing and then using monodispersed spheres of load-bearing material having a diameter which will cause them to protrude above the finished coating an amount which will produce the desired transducer-coating spacing. Since stiction increases with decreased transducer-coating spacing, the ability to control this spacing and hence effectively control the stiction is a significant advantage.

In the prior art coatings containing load-bearing particles, it might be suggested that since only a small proportion of the particles are truly effective as load-bearing particles, the concentration of such particles could be decreased and still provide sufficient coating durability. However, one undesirable effect of such a reduction in particle concentration in the prior art coatings would be a resulting reduction in the atrest transducer-coating spacing, thereby increasing the stiction problem.

Figure 4:
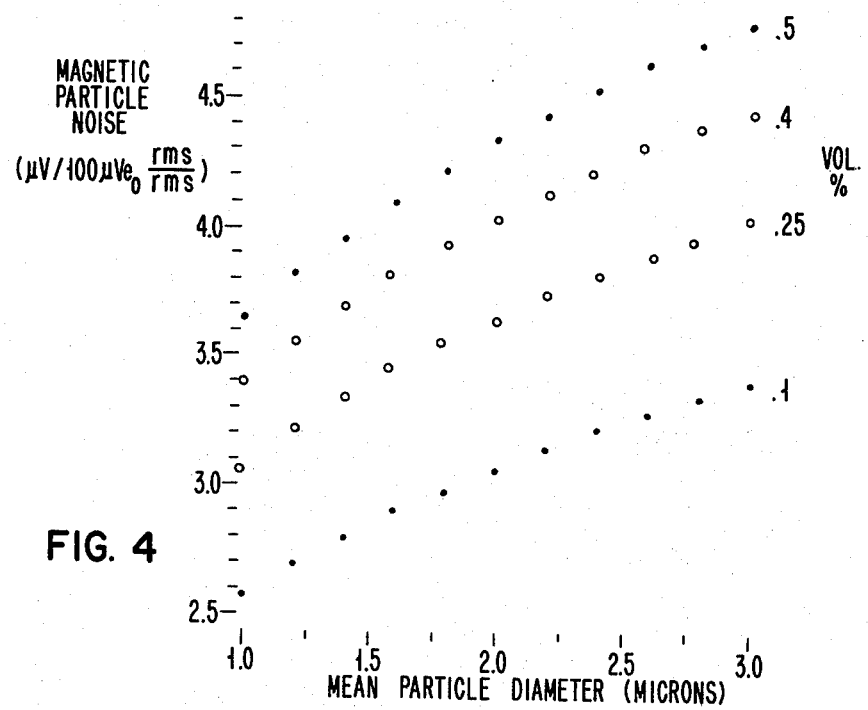
FIG. 4 is a plot of magnetic particle noise as a function of the mean load-bearing particle diameter for four different concentrations of such particles.

FIG. 4 is a plot of magnetic particle noise versus the mean diameter of the load-bearing particles for four different levels of load-bearing particle concentration. As can be seen, the magnetic noise introduced by the load-bearing particles increases as a function of both particle concentration and mean particle diameter.

We claim:

1. A magnetic recording medium comprising magnetic particles and non-magnetic load-bearing particles disposed in a binder as a coating on a substrate, substantially all of said load-bearing particles being a monodispersion of spherical particles, the diameter of substantially all of said spherical load-bearing particles exceeding said coating thickness by not more than 20 percent.

2. A recording medium in accordance with claim 1, in which said spherical load-bearing particles are present in said coating in an amount not exceeding 5% by weight of said magnetic particles.

3. A recording medium in accordance with claim 1, in which said spherical load-bearing particles are present in said coating in an amount between 0.2 percent and 5 percent by weight of said magnetic particles.

4. A recording medium in accordance with claim 1, in which the thickness of said coating is less than 2 microns.

* * * * *